United States Patent [19]

Nonoyama

[11] Patent Number: 4,814,917

[45] Date of Patent: Mar. 21, 1989

[54] ROTARY MAGNETIC HEAD DEVICE

[75] Inventor: Hideki Nonoyama, Tokyo, Japan

[73] Assignee: Sony Corporation, Tokyo, Japan

[21] Appl. No.: 71,137

[22] Filed: Jul. 8, 1987

[30] Foreign Application Priority Data

Jul. 26, 1986 [JP] Japan ................................. 61-176304

[51] Int. Cl.⁴ .......................... G11B 5/53; G11B 15/61
[52] U.S. Cl. ....................................... 360/107; 360/84; 360/130.24
[58] Field of Search ................... 360/107, 108, 84, 85, 360/130.24, 130.23, 130.22, 95

[56] References Cited

U.S. PATENT DOCUMENTS

| 3,863,269 | 1/1975 | Akamino | 360/130.24 |
| 4,641,214 | 2/1987 | Imanishi et al. | 360/84 |
| 4,654,738 | 3/1987 | Kato et al. | 360/130.24 |

FOREIGN PATENT DOCUMENTS

| 90375 | 10/1983 | European Pat. Off. | 360/84 |
| 58-19728 | 2/1983 | Japan | 360/84 |
| 61-227254 | 10/1986 | Japan | 360/130.24 |
| 61-236014 | 10/1986 | Japan | 360/130.24 |
| 61-242317 | 10/1986 | Japan | 360/130.24 |

Primary Examiner—John H. Wolff
Assistant Examiner—Matthew J. Bussan
Attorney, Agent, or Firm—Alvin Sinderbrand

[57] ABSTRACT

A rotary magnetic head device for use with a magnetic recording an/or reproducing apparatus, such as a digital audio tape recorder (DAT) or a video tape recorder (VTR), includes a chassis, a fixed shaft secured to the chassis and a drum unit consisting of an upper drum fixed to the upper end of the fixed shaft and a lower rotary drum rotatably mounted by means of a bearing device on the fixed shaft between the upper drum and the chassis. A rotary transformer consisting of an upper fixed core and a lower rotary core is disposed in a recess formed in the lower side of the fixed upper core. The lower core is attached to the lower rotary drum and carries a head attachment plate carrying in turn a magnetic head. The magnetic tape is wrapped about the drum unit over a prescribed wrapping angle. As the lower drum is rotated by an associated driving device, signals may be recorded on or reproduced from the magnetic tape by the magnetic head kept in frictional contact with the running tape.

15 Claims, 3 Drawing Sheets

ROTARY MAGNETIC HEAD DEVICE

BACKGROUND OF THE INVENTION

1. Field of the Invention

This invention relates to a rotary magnetic head device which is used in conjunction with a magnetic recording and/or reproducing apparatus, especially a small-sized magnetic recording and/or reproducing apparatus, such as a digital audio tape recorder (DAT) or video tape recording (VTR).

2. Description of the Prior Art

It is known in the prior art to use a rotary magnetic head device of the so-called upper rotative drum type in a magnetic recording and/or reproducing apparatus, such as a digital audio tape recorder (DAT) or a video tape recorder (VTR).

Such upper rotative drum type rotary magnetic head devices of the prior art are shown in FIGS. 4, 5 and 6 to be comprised of a lower drum 52, 62 or 72, respectively, which is secured to a mounting base plate, not shown, provided in the main body of the device, and which carries a fixed core 51, 61 or 71 of a rotary transformer 50, 60 or 70. A rotary shaft 54, 64 or 74 is mounted for rotation coaxially of the lower drum 52, 62 or 72 by a bearing 53, 63 or 73, such as, a ball bearing, and an upper drum 55, 65 or 75 is fixedly attached to the rotary shaft 54, 64 or 74. A magnetic head 56, 66 or 76 is attached to the underside of the upper drum 55, 65 or 75 facing toward the lower drum 52, 62 or 72. A rotary core 58, 68 or 78 of the rotary transformer 50, 60 or 70 is secured to a flange 57, 67 or 77 attached in turn to the upper drum 55, 65 or 75 and has its face opposing a face of the fixed core 51, 61 or 71 of the rotary transformer 50, 60 or 70. The upper and the lower drums combine to provide a tape guide drum on the outer periphery of which the magnetic tape is wrapped and adapted to travel therepast with a prescribed wrapping angle. The upper drum 55, 65 or 75 is rotatably driven by an electric motor, not shown, adapted for driving the rotary shaft 54, 64 or 74 so that the tape contact surface at the radially outermost part of the magnetic head 56, 66 or 76 will be brought into sliding contact with the tape surface for recording and/or reproducing prescribed information signals.

Recently, magnetic recording and/or reproducing apparatus which is so small in size as to be portable has been proposed. In reducing the size of the apparatus, it is essential to reduce the size of the rotary magnetic head device incorporated into the main body of the apparatus. For reducing the outer diameter and axial extent of the rotary magnetic head device, it is required to simplify the structure while reducing the number of the components of the device.

However, when the drum diameter is to be reduced in the rotary magnetic head device having the above described structure according to the prior art, a problem arises in respect to suitably accommodating the rotary transformer in the drum, especially in view of the bearing device provided for rotatably supporting the shaft carrying the rotary upper drum, and which needs to be of at least a predetermined radial thickness about the rotary shaft for accommodating friction reducing elements, such as, bearing balls.

Thus, in the prior-art arrangement shown in FIG. 4 wherein the core type rotary transformer 50 is disposed radially outwardly of the bearing device 53 and the cores 51 and 58 face each other at planar confronting surfaces, if the outer diameter of the drums 52 and 55 is reduced, a sufficient area of such confronting surfaces of the rotary transformer 50 cannot be provided since the bearing device 53 is required to have a predetermined radial dimension, as stated above. The result is that signal transmission characteristics of the rotary transformer 50 are significantly lowered.

In the prior-art arrangement shown in FIG. 5 wherein a cylindrical rotary transformer 60 is arranged outside of the bearing device 63 for assuring that the confronting cylindrical surfaces of cores 61 and 68 of the rotary transformer 60 can be of a sufficient area, it is impossible to achieve a sufficient thickness of the fixed core 61 or of the rotary core 68 of the rotary transformer 60 when reducing the outer drum diameter so that difficulties in the assembling operation are increased with a significantly lowered operational efficiency.

In order to overcome the aforementioned problems inherent in the above described rotary magnetic head device in which the rotary transformers 50 and 60 are arranged radially outside of the bearing devices 53 and 63, as shown in FIGS. 4 and 5, it has also been proposed to provide an arrangement in which the rotary transformer 70 having its cores 71 and 78 with planar confronting surfaces is disposed axially above the bearing device 73, as shown in FIG. 6.

When the rotary transformer 70 is disposed above the bearing device 73 in this manner, the overall axial thickness or height of the device is increased in reverse proportion to the reduction in the drum diameter so that it becomes impossible to achieve a rotary magnetic head device of both small axial height and small outer diameter.

It will be noted that, in the above described conventional upper rotative drum type rotary magnetic head devices the upper drums 55, 65 and 75 are provided with wall sections 55a, 65a and 75a extending upwardly from radial walls and serving as the guide surfaces for the magnetic tape, so that they are of a predetermined thickness in the heightwise or axial direction, such wall sections 55a, 65a and 75a define, a dead space opening upwardly in these upper drums 55, 65 and 75 for smoothing the rotation of the upper drums.

OBJECTS OF THE INVENTION

It is a principal object of the present invention to provide a relatively small rotary magnetic head device having a rotary transformer in the rotary magnetic head device which is provided with confronting core surfaces of sufficient area.

It is another object of the present invention to provide a rotary magnetic head device, as aforesaid, which has satisfactory signal transmission properties of the rotary transformer.

It is a further object of the present invention to provide a rotary magnetic head device, as aforesaid, which is of reduced size both in the diametrical and axial directions.

These and other objects of the present invention will become clearer upon reading the following description of preferred embodiments of the present invention especially in conjunction with the accompanying drawings.

DESCRIPTION OF THE PREFERRED EMBODIMENT

Figure 1:
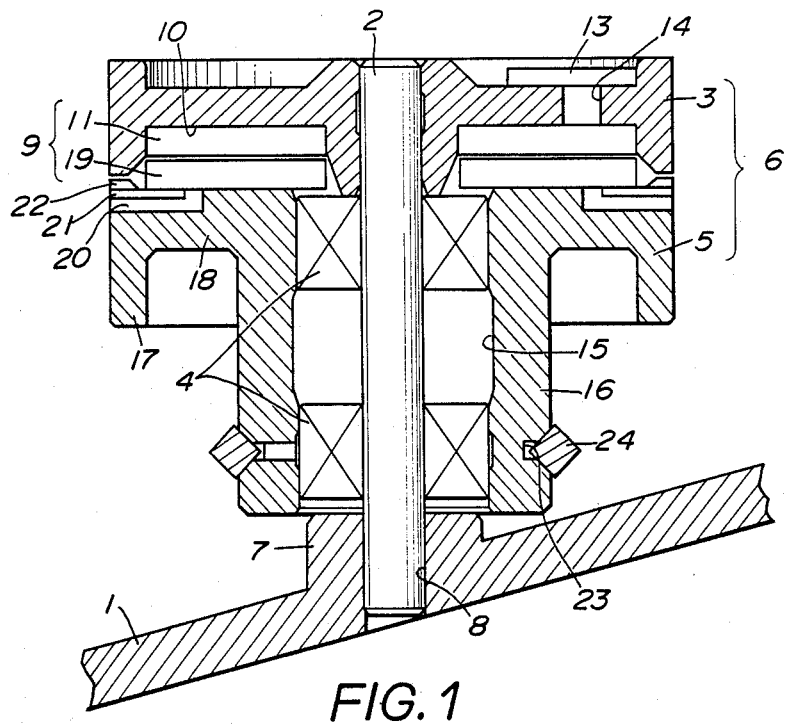
FIG. 1 is a diagrammatic cross-sectional side view showing a rotary magnetic head device according to a first embodiment of the present invention and which has a belt drive.

As shown in FIG. 1, a rotary magnetic head device according to an embodiment of the present invention includes a fixed shaft 2 mounted on a mounting base plate or chassis 1 in the main body of a magnetic recording and reproducing apparatus, not shown, and being tilted relative to such base plate at a predetermined angle. An upper or fixed drum 3 is fixedly mounted on the fixed shaft 2 and a lower or rotary drum 5 is driven by a separate driving unit, such as an electric motor, not shown. The lower drum is mounted by bearings 4, 4 on the fixed shaft 2 for rotation relative to the latter, with the upper drum 3 and the lower drum 5 making up a tape guide drum 6.

The fixed shaft 2 is supported by being press-fitted in an aperture 8 bored in a head attachment boss 7 formed in the mounting base plate 1.

The upper drum 3 is suitably fixed to the upper end of the fixed shaft 2.

The upper drum 3 has its outer peripheral surface formed as the tape guide surface and has a recess 10 opening downwardly at the lower side of the fixed drum 3 for housing a rotary transformer 9. On the bottom surface of the radial wall of drum 3 defining the roof of housing recess 10 is secured the fixed core 11 of the rotary transformer 9.

A transmission coil placed about the fixed core 11 of the rotary transformer 9 is connected by way of a through-hole 14 in the radial wall of drum 3 to a terminal plate 13 which is attached to an upper portion of the upper drum 3, so as to be connected to a separate electric circuit, not shown, provided in the inside of the magnetic recording and reproducing apparatus.

In association with the reduction in the size of the magnetic head device, the wrapping angle of the magnetic tape about the tape guide drum 6 can be reduced, so that the electrical connection can be easily effected from the terminal plate 13 of the upper drum 3 into the inside of the main body of the magnetic recording and/or reproducing apparatus.

The lower drum 5 is made up of a lower relatively small diameter or inner peripheral section 16 defining an axial bore 15 for insertion of the fixed shaft 2, and an upper relatively large diameter or outer peripheral section 17 serving as the tape guide surface. The bearing units 4, 4 are mounted at the upper and the lower ends of the bore 15 formed by the inner peripheral section 16 of the lower drum 5 for rotationally supporting the lower drum 5 on the fixed shaft 2.

The outer peripheral section 17 of the lower drum 5 extends downwards from the radially outer margin of a radially directed flange connecting portion 18 extending from the upper end of the inner peripheral section 16 so that the outer peripheral surface of the section 17 serves as the tape guide surface. On the upper surface of the connecting flange portion 18 of the lower drum 5 is secured a rotary core 19 of the rotary transformer 9 so as to be substantially accommodated within the housing recess 10 of the upper drum 3 in planar confronting or facing relation to the fixed core 11 of the rotary transformer 9.

The upper end of the outer peripheral section 17 is partially formed with an attachment recess 20 for receiving a magnetic head 22. Thus, to the lower surface of the rotary core 19 of the rotary transformer 9 in register with the attachment recess 20, there is secured a head attachment base plate 21 on which the magnetic head 22 is mounted so that the tape contact surface at the radially outermost part of the head will face towards the outside at a gap or interstice formed between the upper drum 3 and the lower drum 5.

In such manner, the fixed and rotary cores 11 and 19 of the rotary transformer 9 are accommodated within a recess 10 of the upper drum that has been a dead or unused space in the conventional upper rotative drum type rotary magnetic head device, so that the inner space of the drum 3 of the tape guide drum unit 6 can be effectively used to provide a sufficient area at which the surfaces of fixed and rotary cores 11 and 19 of the rotary transformer confront while reducing the diametrical and axial size of the rotary magnetic head device.

The rotational driving of the lower drum 5 is achieved by what is called a belt driving system which includes a belt 24 engaged in a belt engaging groove 23 formed at the lower end of the inner peripheral section 16 of the lower drum 5 so as to be driven by an electric motor, not shown, for causing the rotation of the lower drum 5.

Figure 2:
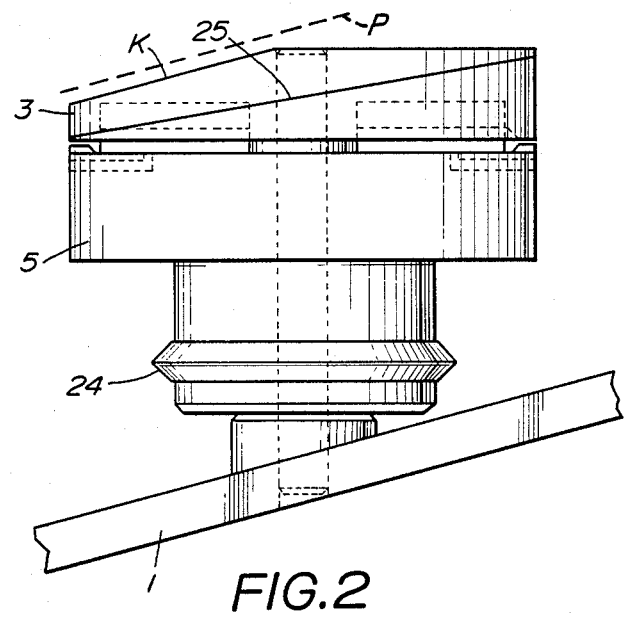
FIG. 2 is a side elevation of the device shown in FIG. 1, with a portion of the upper drum thereof being cut obliquely.

In the above described rotary magnetic head device according to an embodiment of the present invention, the magnetic tape is guided along a tape path delimited by an inclined guide shoulder 25 formed integrally with the upper drum 3 on the outer periphery of the drum 3, with one longitudinal tape edge being in pressure contact with the guide shoulder 25, as the tape runs along the contour of the tape guide drum unit, as shown in FIG. 2, so that the tape contact surface of the magnetic head 22 is slidingly contacted with the magnetic tape along an oblique or skewed track extending across the tape.

In the cassette type magnetic recording and/or reproducing apparatus in which the magnetic tape is housed in the cassette and taken out therefrom by tape loading means so as to be wrapped on the rotary head device, or in which the cassette and the rotary head device are moved relative to each other on the chassis for introducing the rotary head device relative to the magnetic tape within the cassette, since the upper drum 3 of the magnetic head device is fixed, it is possible to obliquely cut at least part of the upper end of the upper drum 3 substantially parallel to the chassis 1 to provide an oblique surface k as shown in FIG. 2. The height of the oblique surface k above the chassis or base plate 1, may be made to conform to the height of an open lid of a cassette when extracting the tape from the tape cassette which is mounted parallel to the chassis 1, or to the height of an upper half of a cassette mouth into which the rotary head device is to be inserted. The open lid and upper half of the cassette are conventionally planar, and the underside of the open lid or of the uppermost portion of the cassette is indicated by the dashed line P. In either case, the overall thickness or vertical height from the chassis 1 of the top surface of the rotary magnetic head device may be easily reduced to be smaller than the height of the open lid or of the upper half of the cassette when in the attached state, so that the rotary magnetic head device embodying the present invention can be readily applied to a cassette magnetic recording and/or reproducing apparatus in which the rotary magnetic head device is introduced into the inside of the cassette mouth.

Figure 3:
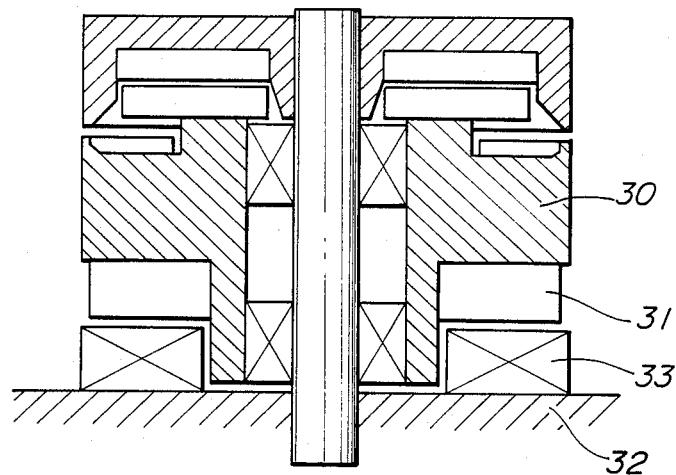
FIG. 3 is a diagrammatic cross-sectional side view showing a rotary magnetic head device according to another embodiment of the invention and which is provided with a direct drive.
Figure 4:
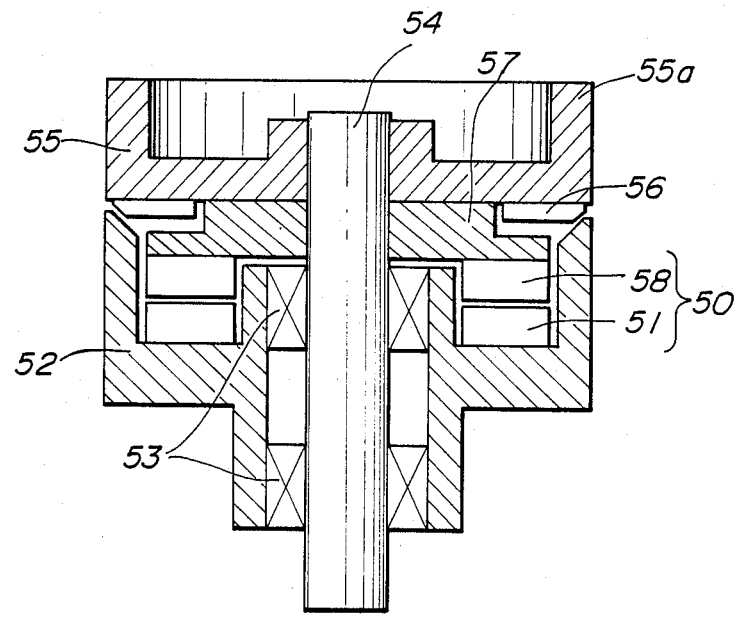
FIGS. 4, 5 and 6 are diagrammatic cross-sectional side views showing upper rotative drum type rotary magnetic head devices according to the prior art.
Figure 5:
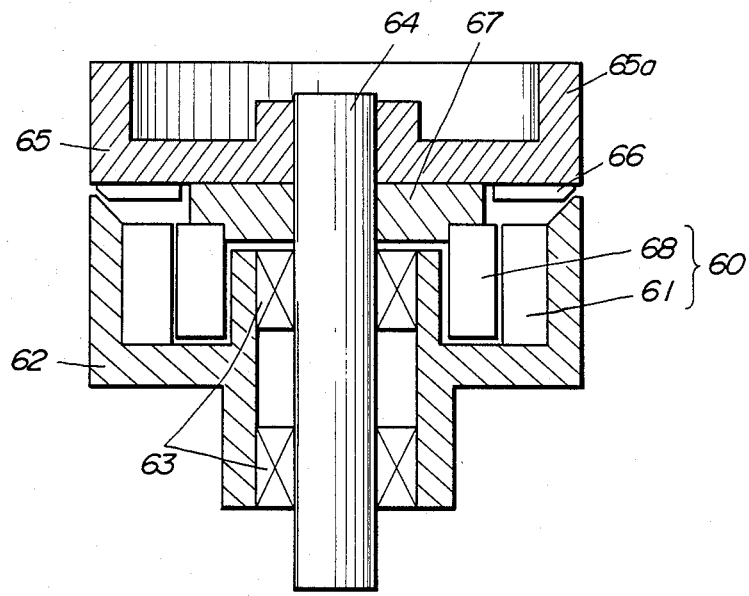
Figure 6:
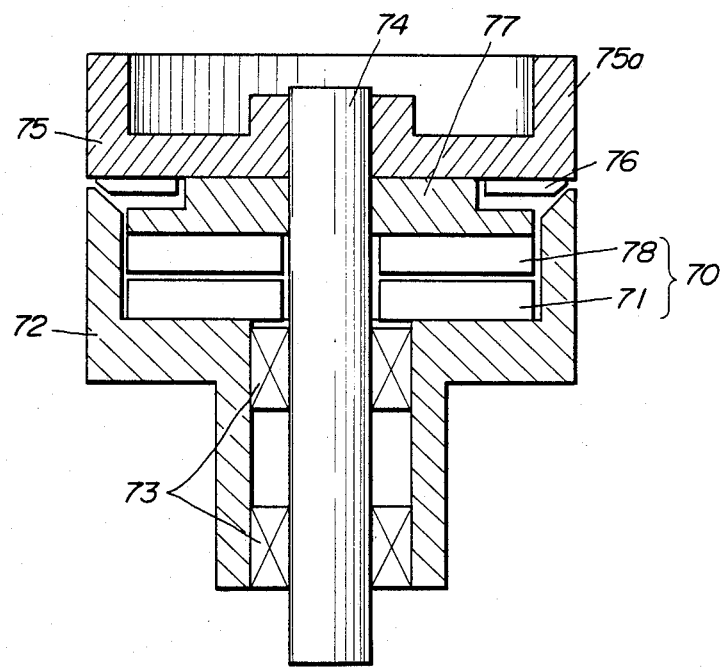

Although a belt drive system is used in the embodiment of the invention described with reference to FIGS. 1 and 2, a so called direct drive arrangement may also be used in which, as shown in FIG. 3, a rotor magnet 31 is disposed at a downwardly facing surface of the outer peripheral portion of the lower drum 30 and a stator coil 33 is mounted on an attachment base plate 32 in opposition to the rotor magnet 31 so that an electric motor unit constituted by magnetic 31 and coil 33 is disposed within the overall axial length of the lower drum. It will be appreciated that with the exception of its rotational drive arrangement, the rotary magnetic head device of FIG. 3 is similar to that described above with reference to FIGS. 1 and 2.

Although illustrative embodiments of the invention have been described in detail herein with reference to the accompanying drawings, it is to be understood that the invention is not limited to those precise embodiments and that various changes and modifications may be effected therein by one skilled in the art without departing from the scope or spirit of the invention as defined in the appended claims.

What is claimed is:

1. A rotary magnetic head device comprising:
a chassis,
a fixed shaft having its lower end secured to said chassis,
a fixed cylindrical upper drum secured to the upper end of said fixed shaft and defining an interior space at the lower side thereof directed toward said chassis,
a rotary transformer including a fixed core and a rotary core in said interior space of said upper drum above said lower side thereof with said fixed core being fixed to said upper drum,
a rotary cylindrical lower drum mounted by bearings on a portion of said fixed shaft disposed between said chassis and said upper drum and having said rotary core of said rotary transformer disposed on the upper side thereof directed towards said upper drum and in facing relation to said fixed core,
said bearings being below said upper side of said lower drum,
a magnetic head carried by said lower drum and projecting a small distance from the outer periphery of said lower drum, and
driving means for effecting rotation of said lower drum so that, when a magnetic tape is wrapped at a predetermined wrapping angle on the outer peripheral surfaces of said lower drum and said upper drum so to be guided along said drums, rotation of said lower drum by said driving means is effective for causing recording and reproducing of signals on and from said magnetic tape by said magnetic head carried by said lower drum.

2. A rotary magnetic head device according to claim 1; wherein said outer peripheral surface of said upper drum has an inclined shoulder for guiding the edge of the magnetic tape as it is wrapped about said peripheral surfaces of the upper and lower drums.

3. A rotary magnetic head device according to claim 2; wherein said inclined shoulder is formed integrally with said upper drum.

4. A rotary magnetic head device according to claim 1; wherein said driving means includes a belt by which said lower drum is driven into rotation.

5. A rotary magnetic head device according to claim 4; in which said lower drum has belt engaging means between said outer periphery of said lower drum and said chassis for engaging said belt.

6. A rotary magnetic head device according to claim 5; wherein said belt engaging means includes a cylindrical portion of said lower drum extending axially below said outer peripheral surface of the lower drum and having a groove extending circumferentially therearound and engaged by said belt.

7. A rotary magnetic head device according to claim 1; wherein said driving means includes a rotor magnet provided on the chassis side of said lower drum and a stator coil disposed on said chassis in opposition to said rotor magnet, said stator coil being energized with an electric current for rotatably driving said lower drum through said rotor magnet.

8. A rotary magnetic head device according to claim 1; wherein a recess for accommodating said rotary transformer is formed in the side of said upper drum directed toward said lower drum, said recess defining said interior space for accommodating both said fixed core fixed to said upper drum and said rotary core fixed to the side of said lower drum directed towards said upper drum for facing towards said fixed core.

9. A rotary magnetic head device according to claim 1; further comprising a magnetic head attachment plate by which said magnetic head is attached to said rotary core and thereby carried by said lower drum.

10. A rotary magnetic head device according to claim 9; wherein said magnetic head attachment plate carrying the magnetic head is secured to a side of said rotary core facing away from said fixed core.

11. A rotary magnetic head device according to claim 1; wherein said upper drum has a recess formed in the upper surface of said upper drum opposite to said lower drum, and a terminal plate for connection to a transmission coil of said fixed core attached to said upper drum is disposed in said recess in said upper surface.

12. A rotary magnetic head device according to claim 1; wherein said fixed shaft is tilted at a predetermined angle in respect to a perpendicular to said chassis, and at least a part of the upper surface of said upper drum opposite to said lower drum is obliquely shaped so as to be substantially parallel with said chassis.

13. A rotary magnetic head device according to claim 12; for use in a recording and/or reproducing apparatus of the type in which a cassette with a magnetic tape enclosed therein is used and mounted parallel to said chassis, and in which the magnetic tape is withdrawn by an associated tape loading system through a cassette mouth from the interior of said cassette having its lid opened, or of the type in which said cassette and said upper and lower drums are relatively moved parallel to said chassis for introducing said upper and lower drums into a cassette mouth for placing said tape about said upper and lower drums, an uppermost part of the attached cassette or of the opened lid lying in a plane parallel to said chassis, and further characterized in that said obliquely shaped part of the upper surface is formed so that the vertical height of said upper and lower drums relative to said chassis is less than the distance of said plane from said chassis.

14. A rotary magnetic head device according to claim 1; wherein inner edges of said fixed and rotary cores radially overlap at least a portion of said bearings.

15. A rotary magnetic head device comprising:
   a chassis,
   a fixed shaft having its lower end secured to said chassis and being tilted at a predetermined angle in respect to a perpendicular to said chassis,
   a fixed cylindrical upper drum secured to the upper end of said fixed shaft and defining an interior space at the lower side thereof directed towards said chassis,
   a rotary transformer including a fixed core and a rotary core in said interior space of said upper drum with said fixed core being fixed to said upper drum,
   a rotary cylindrical lower drum rotatably mounted by bearings on a portion of said fixed shaft disposed between said chassis and said upper drum and having said rotary core of said rotary transformer disposed on the upper side thereof directed towards said upper drum and in facing relation to said fixed core,
   a magnetic head carried by said lower drum and projecting a small distance from the outer periphery of said lower drum, and
   driving means for effecting rotation of said lower drum so that, when a magnetic tape is wrapped at a predetermined wrapping angle on the outer peripheral surfaces of said lower drum and said upper drum so as to be guided along said drums in a path substantially parallel to said chassis, rotation of said lower drum is effective for causing recording and reproducing of signals on and from said magnetic tape by said magnetic head carried by said lower drum,
   said outer peripheral surface of said upper drum having an inclined shoulder formed integrally with said upper drum and substantially parallel with said chassis for guiding the edge of the magnetic tape in said path as said magnetic tape is wrapped about said peripheral surfaces of the upper and lower drums,
   a part of the upper surface of said upper drum opposite to the lower drum being obliquely shaped above said shoulder so as to be substantially parallel with said chassis.

* * * * *